Jan. 24, 1967 W. A. CONINX 3,299,751
PISTON GROOVE CUTTING TOOL
Filed Dec. 29, 1964 2 Sheets-Sheet 2

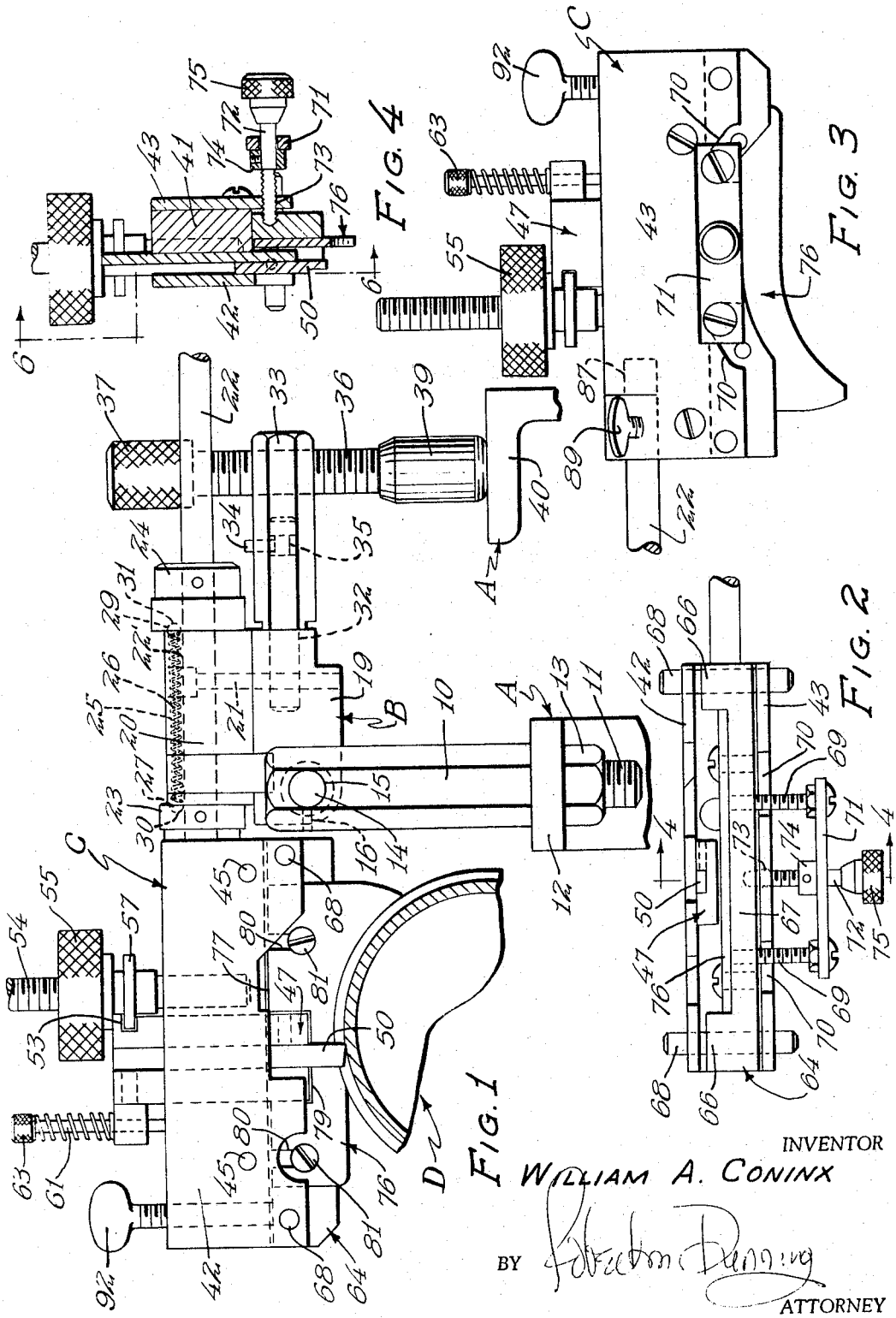

INVENTOR
WILLIAM A. CONINX
BY
ATTORNEY 3,299,751
PISTON GROOVE CUTTING TOOL
William A. Coninx, 273 W. 5th St.,
St. Paul, Minn. 55110
Filed Dec. 29, 1964, Ser. No. 421,945
14 Claims. (Cl. 82—4)

This invention relates to a piston groove cutting tool and particularly a device used to regroove or recut ring grooves in pistons of the type commonly used in internal combustion engines.

After internal combustion engines have been in use for a period of time, it often times becomes necessary to remove and repair the pistons. The uppermost ring grooves, or groove nearest the head of the piston, often becomes badly worn due to the fact that the upper rings take the brunt of the force of the exploded gases and usually receive the least amount of lubrication. In repairing the piston, the upper ring groove is usually recut to accommodate a slightly wider piston ring, the cutting bringing the side walls of the groove back into parallel relation. The regrooving of the piston is a precision job and even an experienced mechanic has difficulty in doing it with ordinary equipment.

The recutting of grooves has usually been done on a regular lathe by placing the piston in the lathe chuck, centering the piston, and cutting the groove. However, in doing this work, the piston must be almost perfectly aligned and perfectly centered if the job is to be accurate. In view of the fact that most such pistons are several inches in diameter, any slight misalignment of the piston axis will cause a groove to be cut on a plane normal to an axis of rotation which is at an angle to the true axis of the piston. If a piston groove is not accurately cut, there is a great tendency for the mechanic to merely insert new rings in the improperly cut groove and to replace the defective piston in the engine, rather than to replace the entire piston.

In the great majority of cases, only the top groove, or groove nearest the head of the piston, must be recut. The second groove as well as the remaining grooves usually are true and require only cleaning or scraping to restore them to proper form. It is the fact that at least one groove of the series remains true and accurate even after considerable wear that makes the present invention practical.

A feature of the present invention resides in the provision of a groove cutting apparatus including a cutting head which is actually free to float during the cutting operation. The head includes a guide blade having an arcuate edge, the guide being of a thickness to fit snugly between the side walls of a piston groove. A cutting tool having a cutting edge of proper width to recut the groove to a predetermined size is supported in spaced relation to the blade. As the piston rotates, the guide blade rides in one groove of the piston, usually the second groove of the piston head, as the cutting blade recuts the adjoining first or upper groove. With this device, the grooves cut cannot be other than in parallel relation to the groove accommodating the guide blade.

A feature of the present invention resides in the provision of a groove cutting apparatus for use in combination with a machine for rotating the piston about its axis. Any suitable means may be used for this purpose such as that shown in my previous Patent 2,690,577, issued October 5, 1954, for "Cleaning Machines." The cutting tool is mounted on a supporting shaft attached to the machine and parallel to the axis of rotation of the piston. The cutting head is thus supported for slidable movement parallel to the piston axis and is also pivotally supported for pivotal movement on either side of a plane normal to the axis of rotation. As a result, if the piston is not truly centered in the rotating machine, the cutting tool will still accurately cut the groove as long as the guide blade is properly engaged in the guide groove, as the position of the head may adjust itself as the piston rotates.

A further feature of the present invention resides in the provision of an apparatus which is particularly adapted for the use in cutting ring grooves in a series of similar pistons. Normally in the repair of an internal combustion engine, all of the pistons are removed, regrooved and cleaned, and new piston rings are applied as required. The present apparatus is particularly designed for such use. A guide blade is applied to the head of the cutting device of proper fitness to fit snugly within the guide groove of the piston. A cutting tool is selected which is of the proper width to cut the groove to the proper size. The spacing between the guide blade and the cutting tool is adjusted in accordance with the spacing of the grooves in the pistons. With the piston rotating and the guide blade riding along the base of the guide groove, the cutting tool is manually moved in a generally radial direction to enter the groove, until a groove of the proper depth is cut. An adjustable stop movable with the cutting tool is then adjusted to limit the movement of the cutting tool to this point. The cutting tool is then retracted and the grooving operation is complete.

By substituting a similar piston for the regrooved piston, the guide blade may again be inserted in the guide groove, and the cutting tool is gradually fed into the groove until the stop which is movable with the tool engages a fixed portion of the head. At this point, the groove being cut is the same depth as the groove previously cut. Thus the entire set of pistons may be grooved to the same depth and to the same width and at the same spacing from the guide groove. In actual practice, the entire grooving operation may be completed in perhaps one half a minute. Furthermore, due to the fact that the cutting tool is automatically in properly spaced relation to the guide blade, a minimum of time is required to change pistons.

A further feature of the present invention resides in the provision of an adjustable means for holding the cutting head in a predetermined relation to the piston. As previously stated, the cutting head is supported upon a shaft parallel to the axis of rotation. The cutting tool and guide blade are adjustably supported on one side of the shaft, and an operating handle extends from the cutting head to the opposite side of the shaft. Means are provided on the handle side of the device which is adjustably engageable with a fixed portion of the frame of the machine to limit the pivotable movement of the pivotally supported structure in one direction. The pivotal movement of the device in the opposite direction is limited by the engagement of the guide blade with the base of the guide groove. Thus while the structure is pivotally supported by the supporting shaft when desired, so that the guide blade may be disengaged from the guide groove, during the cutting operation the device cannot pivot to any marked extent in either direction.

A further feature of the present invention resides in the provision of the device of the type described which may be readily adjusted to accommodate pistons of various shapes and sizes, and grooves of various widths and depths. The guide blade is attached to the head of the device by means of a pair of cap screws which, when slightly loosened, will permit the guide blade to be removed and a blade of a different thickness substituted. Cutters of various widths are provided, and one may be substituted for another by loosening a set screw. The guide blade is slidably supported for transverse movement toward or away from the cutting tool. As a result, the cutting head may quickly and easily be adjusted to be used in conjunction with one set of pistons or another.

In my previous application for patent Serial No. 285,007, filed June 3, 1963, for "Piston Cleaning Tool," now Patent 3,181,191, I disclosed a groove cleaning tool for removing the carbon deposit from piston ring grooves. This cleaning tool is interchangeable with the cutting head of the present structure. If desired, all of the piston grooves may be returned to substantially their original condition by the use of the cleaning tool and then, by substituting the cutting head described herein for the cleaning tool, the ring nearest the head end of the piston may be regrooved. As both the cleaning tool and the present cutting head may also be used in conjunction with the cleaning machine described in my previously mentioned patent, the entire piston cleaning operation may be completed in a fraction of the time previously required for this operation.

These and other objects and novel features of the present invention will be more clearly and fully set forth in the following specification and claims.

In the drawings forming a part of the specification:

FIGURE 1 is a side elevational view of the piston grooving apparatus, the piston to be grooved being shown in section.

FIGURE 2 is bottom plan view of the piston cutting head.

FIGURE 3 is a side elevational view of the cutting head, showing the side thereof opposite the side indicated in FIGURE 1.

FIGURE 4 is a vertical sectional view through the apparatus, the position of the section being indicated by the line 4—4 of FIGURE 3.

At the outset, it should be understood that the cutting tool is used in conjunction with an apparatus for rotating the piston about its axis. This can be a device similar to that disclosed in my patent, above referred to, or it can be a conventional lathe or other such device. Only fragmentary portions of the frame of the piston rotating the machine A are illustrated in view of the fact that the particular device used for rotating the piston is unimportant to the present invention.

The piston grooving apparatus includes a supporting structure which is indicated in general by the letter B and includes the cutting head C which is supported by the supporting structure B. The head C is designed to cut a groove or to regroove a piston, the piston being indicated in general by the letter D. While the head C and the supporting structure B form a part of the same attachment, they have been given different identifying letters because of the fact that the same supporting structure B may also be employed with the groove cleaning tool described in the patent application also above referred to.

Figure 5:
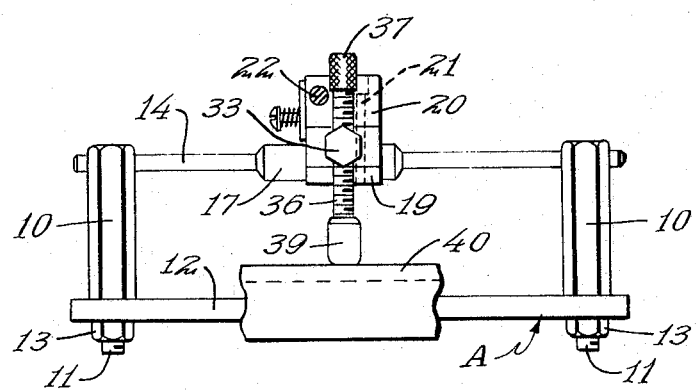
FIGURE 5 is an end elevational view of the apparatus, partly in section, showing the manner in which the cutting device is slidable in an axis parallel to the axis of rotation of the piston.

As indicated in FIGURES 1 and 5 of the drawings, the supporting structure B includes a pair of spaced vertical posts 10 having reduced diameter threaded lower ends 11 which extend through suitable parallel apertures in the frame portion 12 of the piston rotating device A. Nuts 13 are inserted to the end portions 11 to hold the posts then in upright parallel relation. The posts 10 support a horizontal supporting shaft 14 which extends through aligned apertures 15 therein, the shaft being held from endwise movement by set screws 16. A sleeve 17 is supported on the shaft 14 for slidable or pivotable movement thereupon. The sleeve 17 extends through a supporting block 19 and it attached thereto for movement therewith. The block 19 supports a superimposed block 20 which rests upon the flat upper surface of the block 19 and is pivotally supported thereon by means of a vertical pivot bolt 21. The purpose of this arrangement is to permit a relative pivotal movement of the upper block 20 about a generally vertical axis.

A handle shaft 22 extends through a substantially horizontal aperture 22 in the upper pivot block 20 and may rotate with respect thereto. A pair of set collars 23 and 24 are secured to the handle shaft 22 on opposite sides of the pivot block 20. An aperture 25 having its axis parallel to the axis of the aperture 22 extends through the pivot block 20 from end to end thereof. A spring 26 is compressed within the aperture 25 and the opposite ends of the spring engage against detent balls 27 and 29, urging these balls against the ends of the said collars 23 and 24, respectively. The said collars 23 and 24 are provided with indentations or pockets 30 and 31 into which balls 27 may engage when the shaft 22 is in a particular rotative position. The purpose of this arrangement is to normally hold the head C so that the guide blade and cutter blade which will be later described are on a plane normally substantial to the axis of the piston D.

A stub shaft 32 projects from the lower block 19 in a direction generally parallel to the handle 22 in normal position thereof. A sleeve 33 encircles the stub shaft 32, and is held from a normal axial movement by the engagement of a pin or set screw 34 in a peripheral groove 35 in the stub shaft 32. A screw 36 extends through the sleeve 33 on an axis which intersects the axis of the sleeve at right angles. The screw 36 is provided with an enlarged knurled head 37. A socketed foot 39 is supported on the other hand of the screw 36 and is engageable with the surface of a fixed member 40 forming a part of the frame of the piston rotating apparatus A.

Thus it will be seen that the pivotal movement of the block 19 about the axis of the shaft 14 may be limited in one direction by the engagement of the foot 39 of the screw 36 with the frame member 40. At the same time the upper block 19 is free to pivot about the axis of the pivot bolt 21, and the block 19 and the entire apparatus may move longitudinally of the shaft 14. When it is desired to disengage the cutting tool C from the piston B, the screw 36 may be grasped and used to rotate the sleeve 33 to completely disengage the stop from the frame member 40.

Figure 6:
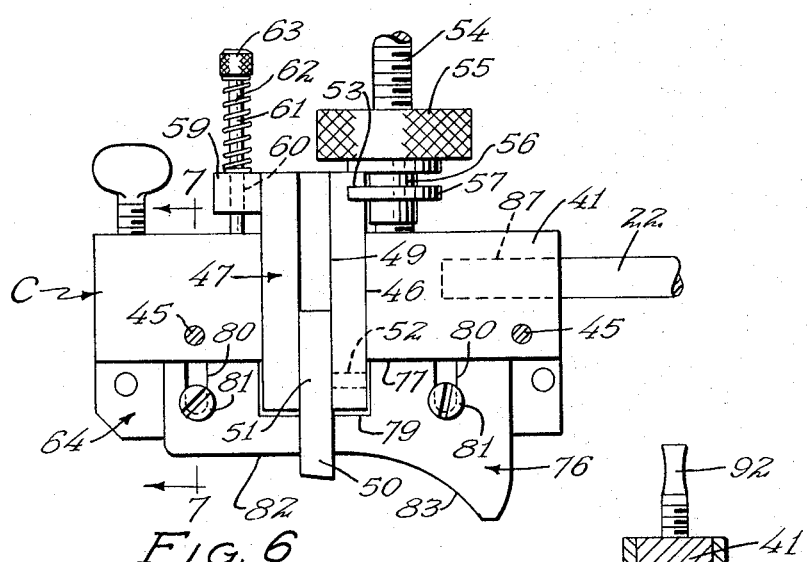
FIGURE 6 is a sectional view of the cutting head, the position of the section being indicated by the line 6—6 of FIGURE 4.
Figure 7:
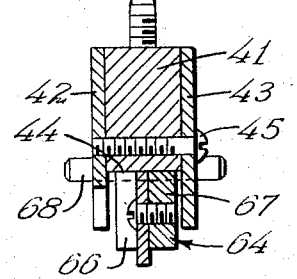
FIGURE 7 is a vertical section to a portion of the cutting head, the position of the head being indicated by the line 7—7 of FIGURE 6.

With reference now to FIGURES 4 and 7 of the drawings, it will be noted that the cutter head C comprises generally and inverted U-shaped body including main body portion 41 to opposite sides of which are connected a pair of side plates 42 and 43 which overlie the sides of the body 41 and project beneath the under surface of 44 of body 41. These body members are secured in face contact by cap screws 45 which extend through the plate 43 and body 41 and are threaded into the plate 42. As is indicated in the FIGURE 6 of the drawings, a vertical rectangular groove 46 is formed in the surface of the block-like body portion 41 adjoining the side plate 42. The groove 46 slidably supports a cutter tool holder 47 which is generally rectangular in horizontal section but which is provided with longitudinally extending rectangular groove 49 therein. The cutting tool 50 is provided with a generally rectangular shank 51 which is engaged in the groove 49, the cutting tool being held in place in the tool holder 47 by means of a set screw 52. The tool holder 47 is provided with a rectangular notch 53 in a side edge near its upper end. A threaded stud 54 is anchored in the body portion 41 with its axis parallel to the axis of movement of the tool holder 47. The stud 54 supports a knurled thumb nut 55 having a downwardly projecting hub 56 supporting a peripheral flange 57. The stud 54 is properly located so that the flange 57 may engage in the notch 53. Rotative movement of the thumb nut 55 on the stud 54 will move the flange 57 axially, and move the tool holder 47 and the tool 50 supported thereby in a direction radially of the piston D when the tool holder C is in position.

The tool holder 47 is provided with a laterally extending lug or projection 59 at its upper extremity which is apertured at 60 to accommodate an adjustment screw 61. A spring 62 encircles the screw 60 between the top of the lug 59 and the enlarged head 63 of the adjustment screw which may be knurled for manual operation. The purpose of the spring 62 is merely to frictionally resist the rotation of the screw and thus to hold the screw in an adjusted position. The lower end of the screw 61 is engageable with a portion of the upper surface of the body member 41. Thus the screw may limit the downward movement of the tool holder.

The cutting head also includes a guide blade holder 64 which is rectangularly notched intermediate its ends so as to provide relatively thick end supporting portion 65 and a relatively thin connecting portion 67. The guide blade holder 64 is slidably supported by a pair of parallel pins 69 which span the gap between the side plates 42 and 43 and are supported thereby. The blade holder 64, even at its relatively wider ends 66, is somewhat narrower than the space between the side plates 42 and 43 so as to permit a lateral movement of the guide blade holder between the plates.

With reference now to FIGURES 2 and 4 of the drawings, means are provided for moving the guide blade holder 64 toward or away from the side plates 42 and 43. A pair of parallel screws or studs 69 are anchored to the blade holder 64 to extend in parallel relation and in right angular relation to the vertical surface of the blade holder, through the side plate 43. The bolts or studs 69 extend through notches 70 in the side plates of 43 and act to support a crosshead 71 in parallel relation to the blade holder. An adjustment screw 72 extends through the center of the crosshead 71 and is threaded into the side plate 43 as indicated at 73. A set collar 74 holds the adjustment screw 72 from axial movement relative to the crosshead 71 so that rotation of the screw by the enlarged head 75 thereof will move the cross head 71 toward or away from the side plate 43 and will similarly move the blade holder 64 which is in fixed relation to the crosshead 71. This provides the means of moving the guide blade 76 nearer to, or farther from, the cutting tool 50.

Figure 8:
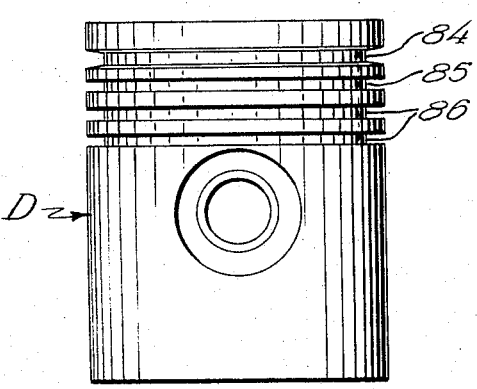
FIGURE 8 is a diagrammatic elevation view of a typical piston.

The guide blade 76 fits snugly into the notch between the thickened end portions 66 of the blade holder 64. The blade 76 includes a substantial straight upper edge of 77 interrupted by a rectangular notch 79 which is in registry with the lower end of the tool holder 47. The purpose of the notch 79 is to permit the blade 76 to be adjusted into closer proximity with the cutting tool 50 when it is desired. The upper blade edge 77 is also provided with a pair of spaced slots 80 designed to accommodate the shanks of blade mounting cap screws 81. The cap screws 81 are threaded into the center connecting portion 67 of the blade holder 64. By loosening the cap screws 81, the blade 76 may be disengaged from the blade holder 64. The blade 76 includes a substantially straight edge lower portion 82 which is designed to extend tangentially to the base of the guide groove and which extends to a point directly above the axis of rotation of the piston D. This straight portion 82 forms the trailing edge of the guide blade. The forward portion of the lower blade edge is arcuate as indicated at 83, the radius of arcuation being substantially equal to the radius of the guide groove in which it is engaged. The radius of the edge portion 83 may be slightly greater than the radius of the groove base as long as a substantial length of the lower edge of the blade is engaged in the groove. FIGURE 8 shows a typical piston D, the top groove 84 being the groove which is normally cut or regrooved, and the adjoining groove 85 being the groove which is normally used as the guide groove. The groove 85 as well as the lower grooves 86 are usually not worn sufficiently to warrant regrooving.

As the wear of the grooves usually decreases from the top groove to the bottom, any of the lower grooves may be used as the guide groove if the next above groove needs recutting.

While not specifically illustrated in the drawings, the end of the handle 22 which is imbedded in a socket 87 in the body portion of 41 is preferably flattened so that a thumb screw 89 (see FIGURE 3) may hold the head C in fixed relation to the handle. The head C is normally supported with the guide blade 76 in a vertical plane normal to the axis of rotation of the piston D by the detent balls 27 and 29. However, when the head C is lifted out of engagement with the piston D, the head may be rotated by rotation of the handle 22 to simplify the removal of the guide blades and the replacement of the cutting tool 50.

The operation of the apparatus may be as follows: Normally the operation calls for the cleaning and regrooving of a set of six or eight pistons removed from an internal combustion engine. Usually, one piston D of the set is mounted in the piston rotating machine A and either before or after this operation, at least the guide groove is cleaned of carbon or other foreign material if such cleaning is required. A guide blade 76 is selected which will fit snugly in the guide groove 85. A cutting tool 50 is selected which will cut the upper groove 84 to the desired width. The guide blade 76 is attached to the blade holder 64 and the cutting tool 50 is attached in position in the tool holder 47. The cutting tool 50 is retracted to be out of engagement with the piston when the blade 76 is engaged with the base of the groove 85.

The support B is positioned to support the blade on a plane substantially normal to the axis of the piston D and the blade 76 is engaged in the guide groove 85 to be enclosed within a substantial angular length of the groove. The adjustment screw 72 is then rotated to move the position of the blade holder 64 relative to the position of the cutting tool 50 until the cutting tool 50 is in proper position to recut the groove 84. The screw 36 is adjusted so that the foot 39 rests upon the frame member 40. The device is then ready for operation.

As the piston rotates in a counter clockwise direction as viewed in FIGURE 1, the adjustment nut 55 is rotated on the stud 54, the flange 57 engaging the notch 53 in the tool holder 47 and lowering the blade holder to move the cutting tool 50 in a generally radial direction toward the center of the piston. As the piston rotates, the cutting tool 50 cuts the groove 84 to the desired width. When the groove has been cut to the desired depth, the adjustment screw 61 is rotated until the lower end of this screw engages the upper surface of the body 41. This limits the depth to which the groove may be cut relative to the surface of the guide blade 76.

At the completion of the recutting operation, the piston D is replaced by a similar piston after the cutting tool 50 has been retracted. When the new piston is in place, the blade 76 is inserted into the guide groove of this second piston. During the changing of the pistons, the foot 39 is swung out of engagement with the frame member 40 by rotating the sleeve 33 about the axis of the stub shaft 32. When the blade 76 is in place, the sleeve 33 is again rotated until the foot 39 engages the frame member 40. The groove 84 in the second piston may then be cut by gradually lowering the blade holder 47 until further movement is blocked by the stop screw 61. The cutting tool is again retracted and the operation may be repeated.

Thus it will be seen that an entire set of pistons may be regrooved to virtually identical dimensions by use of the cutting head C. Where the cutting head is used in conjunction with an apparatus for cleaning the entire surface of the piston and cleaning all of the grooves of the piston, the entire operation can be completed by relatively little more time.

The purpose of the thumb screw 92 has not been described. The purpose of this thumb screw is to provide an additional means of holding the guide blade carrier 64 in an adjusted position if and when an additional means is required. The guide screw 92 is threaded vertically through the body member 41 and into engagement with the upper surface of the blade carrier 64.

One of the biggest advantages of the present invention lies in the fact that the guide blade 76 is engaged in the guide groove through a considerable angular distance. As a result, the guide blade is held on a plane normal to the axis of rotation even though the piston is not centered with complete accuracy. As the cutting tool 50 is maintained in an adjusted spaced relation to the guide blade, the groove 84 is accurately machined and regrooved in spite of such inaccurate centering. As a result, where in the past any slight wobbling of the piston due to inaccurate centering would cause the groove to be recut on a plane normal to the axis of rotation rather than the actual axis of the piston, the floating support of the cutting head and the manner in which the cutting tool is guided, prevents such inaccuracies in the present device.

In accordance with the patent statutes I have described the principles of construction and operation of piston groove cutting tools; and while I have endeavored to set forth the best embodiment thereof, I desire to have it understood that obvious means could be used within the scope of the following claims without departing from the spirit of my invention.

I claim:

1. A piston groove cutting tool adapted to be used to cut grooves in an axially rotated piston comprising:
    (a) a groove cutting tool,
    (b) alignment means to position said cutting tool means in continuous alignment with a piston groove to be regrooved, said alignment means including a guide blade adapted to engage within a segment of one piston groove to position the groove cutting tool in alignment with a second piston groove,
    (c) means to support said cutting tool in cutting relation to an axially rotated piston and supporting said tool and blade for free sliding movement parallel to the piston axis,
    (d) means to move said cutting tool toward and away from cutting engagement with a said axially rotated piston.

2. The structure of claim 1 and in which said means to move said cutting tool toward and away from cutting engagement includes means to hold said cutting tool in cutting engagement.

3. A piston groove cutting tool adapted to be used to recut grooves in an axially rotated piston having parallel grooves comprising:
    (a) a cutting head including a groove cutting tool means,
    (b) alignment means secured to said head in movably spaced apart planar relation to said cutting tool means and adapted to engage within a segment of one said piston groove to position said cutting tool means in continuous cutting alignment with a piston groove to be regrooved,
    (c) means to support said cutting tool in cutting relation to an axially rotated piston and supporting said blade and tool for free sliding movement parallel to the piston axis,
    (d) means to move said cutting tool toward and away from cutting engagement with said axially rotated piston.

4. The structure of claim 3 and in which said means to support said cutting tool includes a frame having a shaft having its longitudinal axis in substantially parallel relation to the axis of an axially rotated piston, a mounting block slidably secured to said shaft, said head being connected to said block.

5. The structure of claim 3 and in which said means to move said cutting tool includes a handle means pivotally and slidably engaged to said support means or an axis parallel to the axis of rotation of said piston.

6. A piston groove cutting tool adapted to be used to recut grooves in an axially rotated piston having parallel grooves comprising:
    (a) a frame having a support shaft having its longitudinal axis in generally parallel relation to the axis of an axially rotated piston,
    (b) a mounting block slidably and pivotally engaged to said shaft,
    (c) an axially rotatable handle secured to said mounting block,
    (d) a cutting head detachably secured to one end of said handle,
    (e) said cutting head including a groove cutting tool and a guide blade in movably spaced apart planar relation to said tool,
    (f) said guide blade adapted to engage within a segment of one of said piston groove to position said cutting tool in continuous alignment with a second said piston groove to be regrooved,
    (g) whereby movement of said handle causes related movement of said head.

7. The structure of claim 6 and in which said mounting block includes a pair of pivot blocks and means on a plane normal to the axis of rotation of said piston pivotally connecting said pivot blocks in face contact relation.

8. The structure of claim 6 and in which said head includes a stop means limiting the depth of cut by said cutting tool.

9. The structure of claim 6 and in which said guide blade includes an elongated edge portion engageable in a said piston groove.

10. The structure of claim 6 and in which said cutting head includes means to lock said cutting tool and said guide blade in one spaced apart position.

11. A piston groove recutting device for recutting a groove in a cylindrical piston having a series of parallel grooves arranged on planes normal to the piston axis, the device including:
    (a) a cutting head including a cutting tool of proper width to recut the piston groove,
    (b) a guide blade of a thickness to fit snugly in a second groove spaced from the groove to be recut,
    (c) said guide blade being engaged in a sufficient angular length of said second groove to hold said guide blade in a plane normal to the axis of rotation of said piston and adapted to engage the base of said second groove,
    (d) means supporting said cutting head in floating relation to said piston, and
    (e) means to adjust the position of said cutting tool in a direction substantially radially from the axis of piston rotation.

12. The structure of claim 11 and including adjustable means for limiting the movement of said cutting tool toward the axis of piston rotation.

13. The structure of claim 11 and including means for adjusting the spacing between said cutting tool and said guide blade.

14. The structure of claim 11 and including means for releasably holding said guide blade in engagement with the base of said second groove.

References Cited by the Examiner

UNITED STATES PATENTS

| | | |
|---|---|---|
| 1,454,834 | 5/1923 | Hammett. |
| 2,497,228 | 2/1950 | Miller. |
| 2,566,048 | 8/1951 | Wetzel. |
| 2,570,416 | 10/1961 | Wittman. |

WILLIAM W. DYER, Jr., *Primary Examiner.*

LEONIDAS VLACHOS, *Examiner.*